United States Patent
Mueller et al.

(10) Patent No.: US 10,082,722 B2
(45) Date of Patent: Sep. 25, 2018

(54) DUAL FREQUENCY PUMPED OPTICAL PARAMETRIC OSCILLATOR

(71) Applicant: QIOPTIQ PHOTONICS GMBH & CO. KG, Göttingen (DE)

(72) Inventors: Frank Mueller, München (DE); Arne Härter, München (DE)

(73) Assignee: Qioptiq Photonics GmbH & Co KG, Göttingen (DE)

( * ) Notice: Subject to any disclaimer, the term of this patent is extended or adjusted under 35 U.S.C. 154(b) by 0 days.

(21) Appl. No.: 15/646,434

(22) Filed: Jul. 11, 2017

(65) Prior Publication Data
US 2018/0024414 A1    Jan. 25, 2018

(30) Foreign Application Priority Data
Jul. 21, 2016    (EP) .................................... 16180651

(51) Int. Cl.
| *G02F 1/39* | (2006.01) |
| *G02F 1/35* | (2006.01) |
| *G02F 1/37* | (2006.01) |

(52) U.S. Cl.
CPC .............. *G02F 1/39* (2013.01); *G02F 1/3501* (2013.01); *G02F 1/37* (2013.01);
(Continued)

(58) Field of Classification Search
CPC .. G02F 1/3501; G02F 1/39; G02F 2001/3507; G02F 2201/17; G02F 2203/58
See application file for complete search history.

(56) References Cited

U.S. PATENT DOCUMENTS

| 5,812,305 A * | 9/1998 | Blake ........................ G02F 1/39 359/330 |
| 6,456,424 B1 * | 9/2002 | Arbore ....................... G02F 1/39 359/330 |

(Continued)

FOREIGN PATENT DOCUMENTS

WO    2012126495    9/2012

OTHER PUBLICATIONS

Gerald T. Moore et al., "The Tandem Optical Parametric Oscillator", IEEE Journal of Quantum Electronics, vol. 32, No. 12, Dec. 1996, pp. 2085-2094.*

(Continued)

*Primary Examiner* — Daniel Petkovsek
(74) *Attorney, Agent, or Firm* — Peter A. Nieves; Sheehan Phinney Bass & Green PA

(57) ABSTRACT

A system includes an optical parametric oscillator (OPO) device. The OPO device has an optical resonator, a first nonlinear optical element (NLO) and a second non-linear optical element (NLO). The first NLO can produce, via OPO of a first pump beam, a first output with a first frequency and a second output with a second frequency. The second frequency is lower than the first frequency. The second NLO can produce, via OPO of a second pump beam (with a higher frequency than the first), a third output with a third frequency and a fourth output with a fourth frequency. The fourth frequency is lower than the third frequency. The first frequency is the same, or at least substantially the same, as the fourth frequency. The OPO device is configured to resonate at the first frequency and the fourth frequency.

19 Claims, 5 Drawing Sheets

(52) U.S. Cl.
CPC ............... *G02F 2001/3503* (2013.01); *G02F 2001/3507* (2013.01); *G02F 2201/16* (2013.01); *G02F 2201/17* (2013.01); *G02F 2203/15* (2013.01); *G02F 2203/58* (2013.01)

(56) References Cited

U.S. PATENT DOCUMENTS

| | | | | |
|---|---|---|---|---|
| 6,985,282 B2 * | 1/2006 | Snell | ............... | G02F 1/39 |
| | | | | 359/330 |
| 7,486,435 B2 * | 2/2009 | Slater | ............... | G02F 1/39 |
| | | | | 359/326 |
| 8,477,410 B2 * | 7/2013 | Hodgson | ............... | H01S 3/0057 |
| | | | | 359/330 |
| 8,599,474 B1 * | 12/2013 | Kozlov | ............... | G02F 1/39 |
| | | | | 359/326 |
| 2002/0048078 A1 * | 4/2002 | Schiller | ............... | G02F 1/39 |
| | | | | 359/330 |
| 2011/0180729 A1 | 7/2011 | Kafka et al. | | |
| 2013/0027708 A1 | 1/2013 | Foltynowicz | | |
| 2017/0102604 A1 * | 4/2017 | Ebrahim-Zadeh | ............... | G02F 1/39 |

OTHER PUBLICATIONS

Samanta, GK; et al, Continuous-Wave, two-crystal, singly-resonant optical parametric oscillator: Theory and experimen; 2013 Optical Society of America, vol. 21, No. 8.

Ingo Breunig et al; Limitations of the tunability of dual-crystal optical parametric oscillators; Jun. 1, 2007 / vol. 32, No. 11 / Optics Letters.

Dunn, Malcolm H. et al; Optical Parametric Oscillators; article in Advances in Lasers and Applications, Proceedings of the Fifty Second Scottish Universities Summer School in Physics, Sep. 1998.

* cited by examiner

Resonant Wavelength / nm

DUAL FREQUENCY PUMPED OPTICAL PARAMETRIC OSCILLATOR

CROSS-REFERENCE TO RELATED APPLICATIONS

This application claims the benefit of European Patent Application serial number 16180651.8, filed Jul. 21, 2016, entitled "Dual Frequency Pumped Optical Parametric Oscillator," which is incorporated by reference herein in its entirety.

FIELD OF THE INVENTION

This disclosure relates to light sources, and more particularly, relates to dual frequency pumped optical parametric oscillators.

BACKGROUND OF THE INVENTION

An optical parametric oscillator (OPO) is a light source emitting radiation with properties comparable to that of a laser. OPOs are nonlinear devices that split high frequency pump photons into two lower frequency photons, namely signal and idler photons. The frequencies of the signal and idler photons are not independent from each other, but may be tuned in frequency.

OPOs need an optical resonator, but in contrast to lasers, OPOs are based on direct frequency conversion in a nonlinear optical element rather than from stimulated emission. OPOs exhibit a power threshold for an input light source (pump), below which there is negligible output power in the signal and idler bands.

SUMMARY OF THE INVENTION

In one aspect, a widely tunable light source is based on combining two nonlinear optical elements (e.g., crystals configured for Optical Parametric Oscillation) into one OPO device by using a common optical resonator.

In a typical implementation, the resonator of the OPO device contains the two nonlinear optical elements being pumped at different frequencies, respectively. The first nonlinear optical element produces a first output having a first frequency and a second output having a second frequency, the second nonlinear optical element produces a third output having a third frequency and a fourth output having a fourth frequency. The higher frequency output of the first nonlinear optical element and the lower frequency output of the second nonlinear optical element are made identical, or at least substantially identical (via appropriate phase matching of the two nonlinear optical elements, for example). In this context, the phrase "substantially identical" may mean that the two frequencies are identical to a degree that results in a single longitudinal mode appearance of the resonant wave. The optical resonator is resonant at this frequency.

In another aspect, a system includes an optical parametric oscillator (OPO) device that has an optical resonator, a first nonlinear optical element, and a second nonlinear optical element. The first nonlinear optical element is configured to receive a first pump beam and to produce (via optical parametric oscillation of the first pump beam) a first output having a first frequency and a second output having a second frequency. The second frequency is lower than the first frequency. The second nonlinear optical element is configured to receive a second pump beam that has a higher frequency than the first pump beam, and to produce, via optical parametric oscillation of the second pump beam, a third output having a third frequency and a fourth output having a fourth frequency. The fourth frequency is lower than the third frequency. The first frequency is the same or substantially the same as the fourth frequency. The OPO device is configured to resonate at the first frequency and the fourth frequency.

In yet another aspect, a method is disclosed for producing widely frequency tunable laser radiation from a system. The system includes an optical parametric oscillator (OPO) device with an optical resonator, a first nonlinear optical element inside the optical resonator, and a second nonlinear optical element inside the optical resonator. The method includes receiving a first pump beam at the first nonlinear optical element and producing (via optical parametric oscillation of the first pump beam at the first nonlinear optical element) a first output having a first frequency and a second output having a second frequency. The second frequency is lower than the first frequency. The method further includes receiving a second pump beam at the second nonlinear optical element (the second pump beam has a higher frequency than the first pump beam) and producing (via optical parametric oscillation of the second pump beam at the second nonlinear optical element) a third output having a third frequency and a fourth output having a fourth frequency. The fourth frequency is lower than the third frequency. The first frequency is the same or substantially the same as the fourth frequency. The OPO device is configured to resonate at the first frequency and the fourth frequency.

In still another aspect, a method of manufacturing an optical parametric oscillator (OPO) device is disclosed. The method includes providing an optical resonator. The method further includes configuring a first nonlinear optical element relative to (e.g., inside) the optical resonator to receive a first pump beam and to produce, via optical parametric oscillation of the first pump beam, a first output beam having a first frequency and a second output beam having a second frequency. The second frequency is lower than the first frequency. The method further includes configuring a second nonlinear optical element relative to (e.g., inside) the optical resonator to receive a second pump beam that has a higher frequency than the first pump beam, and to produce, via optical parametric oscillation of the second pump beam: a third output beam having a third frequency and a fourth output beam having a fourth frequency. The fourth frequency is lower than the third frequency. The first frequency is substantially the same as the fourth frequency. The OPO device resonates at the first frequency and the fourth frequency.

In some implementations, one or more of the following advantages are present.

For example, while conventional lasers produce relatively limited fixed frequencies, OPOs may be desirable because the signal and idler frequencies, which are determined by the conservation of energy and momentum (via phase matching), can be varied in wide ranges. Thus, in a typical implementation, it may be possible to access frequencies, for example in the near-infrared, mid-infrared, far-infrared or terahertz spectral region, which may be difficult to obtain from a laser. In addition, OPOs allow for wide frequency tunability, for example, by changing the phase-matching conditions of the OPOs in a common optical resonator. In a typical implementation, this makes the OPOs useful tools, for example, in various applications like laser spectroscopy.

In addition, in a typical implementation, the OPO device may be able to overcome a threshold power level at resonant frequencies where at least one of the two separate OPOs would not, e.g. because of a lack of availability of suitable high-power pump-lasers at attractive frequencies or low nonlinear efficiency of the nonlinear material at certain frequencies.

Other features and advantages will be apparent from the description and drawings, and from he claims.

BRIEF DESCRIPTION OF THE DRAWINGS

Like reference characters refer to like elements.

DETAILED DESCRIPTION

Figure 1:
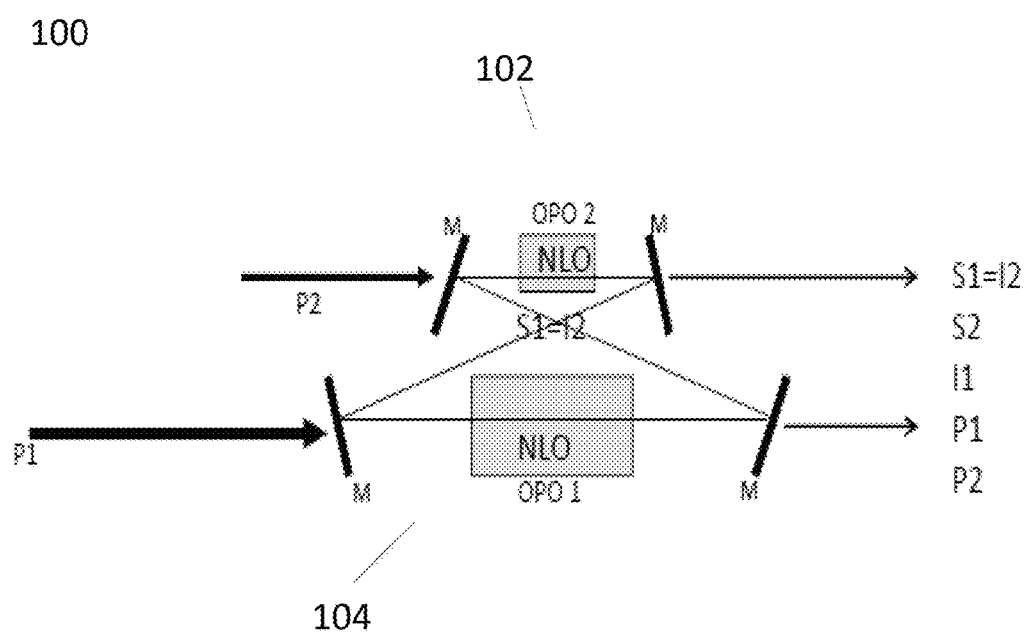
FIG. 1 is a schematic representation of an exemplary implementation of a system that includes a dual frequency pumped OPO-device.

FIG. 1 is a schematic representation of first exemplary system 100 that includes an optical parametric oscillator (OPO) device 102 and, more particularly, a dual frequency pumped optical parametric oscillator.

The illustrated OPO device 102 has an optical resonator 104, a first nonlinear optical element (e.g., a crystal configured for Optical Parametric Oscillation) OPO1, and a second nonlinear optical element (e.g., also a crystal configured for Optical Parametric Oscillation) OPO2. There are two input pump beams P1 and P2 shown in FIG. 1 as being directed into the optical resonator 104. The output from the optical resonator 104 has five different frequencies (S1=I2, S2, I1, P1 and P2).

Generally speaking, an optical resonator is an arrangement of optical components that allow a beam (or beams) of light to resonate or circulate in a closed path therein. The optical resonator 104 in the illustrated implementation consists of four mirrors (M) arranged as shown. In a typical implementation, the mirrors are highly reflective for the resonant wave (e.g., S1, I2) with one mirror typically being coated such that a component (of significant power) of the resonant wave can escape the optical resonator through it. Typically, at least one of the mirrors is highly transmissive for non-resonant frequencies.

The optical resonator 104 in the system 100 of FIG. 1 represents one particular example of an optical resonator. Many variations are possible. Indeed, resonators can be made in very different forms and can include any number of optical elements (e.g., mirrors, etc.) arranged in a variety of different ways.

In the illustrated implementation, the nonlinear optical elements OPO1, OPO2 are inside the optical resonator 104 and arranged so that the pump beams P1, P2 that enter the optical resonator 104 are directed toward and pass through the nonlinear optical elements OPO1, OPO2, respectively.

Generally speaking, light in the optical resonator 104 may be reflected by the mirrors M multiple times resulting in light passing through each nonlinear optical element OPO1, OPO2 typically more than once. In a typical implementation, the respective pump beam, as well as light at wavelengths produced by the respective nonlinear optical elements OPO1, OPO2 overlap inside the nonlinear optical elements OPO1, OPO2.

The nonlinear optical elements OPO1, OPO2 can take a variety of different forms. In one example, the nonlinear optical elements OPO1, OPO2 can be made of Magnesium Doped Lithium Niobate (MgO:LiNbO$_3$), periodically poled and having a multiple grating or a fan-out structure for frequency tuning. The nonlinear optical elements OPO1, OPO2 can be made of doped or un-doped LiNbO$_3$ with or without periodic poling or a single grating, and/or KTP with or without periodic poling, among other materials. Other possible materials may include doped or un-doped LiTaO3 with or without periodic poling, RbTiOAsO$_4$ with or without periodic poling, or BBO. The nonlinear optical elements OPO1, OPO2 may be placed inside an oven for temperature control and/or placed on a translation-stage to change the poling period of a nonlinear crystal with more than one poling period. In various implementations, the nonlinear elements OPO1, OPO2 can be any kind of nonlinear media (e.g., a crystal) that responds nonlinearly to light, typically very high intensity light, such as that provided by a laser.

The nonlinear elements OPO1, OPO2 in the illustrated implementation may be crystals configured to be used in optical parametric oscillators (OPO). Generally speaking, an OPO converts an input laser beam (e.g., pump beam P1 or P2) with frequency o into two output waves of lower frequency ($\omega_s$, $\omega_i$) via second-order nonlinear optical interaction. The sum of the frequencies of the two output waves is equal to the input wave frequency (i.e., $\omega_s+\omega_i=\omega_p$). Typically, the output wave with the higher frequency $\omega_s$ is referred to as the signal wave (or just the signal), and the output wave with the lower frequency $\omega_i$ is referred to as the idler wave (or just the idler). Because OPOs do not convert all the input energy into the signal and idler, a residual pump wave may be part of the output from an OPO as well.

Of the two pump beams P1, P2 shown in the illustrated implementation being directed into the optical resonator 104, the first pump beam P1 has a lower frequency (e.g. at least 10% lower) than the second pump beam P2. In a typical implementation, each pump beam P1, P2 is provided by a corresponding laser (not shown in FIG. 1).

The first nonlinear optical element OPO1 is inside the optical resonator 104 and is configured to receive the first pump beam P1 (e.g., right after the first pump beam P1 enters the optical resonator 104). The first nonlinear optical element OPO1 is further configured to produce, via optical parametric oscillation of the first pump beam P1, a first output (a signal, S1) having a first frequency and a second output (an idler, I1) having a second frequency that is lower than the first frequency.

The second nonlinear optical element OPO2 also is inside the optical resonator. Moreover, it is configured to receive the second pump beam P2 (e.g., right after the second pump beam P2 enters the optical resonator 104). The second nonlinear optical element is further configured to produce, via optical parametric oscillation of the second pump beam P2, a third output (a signal, S2) having a third frequency and a fourth output (an idler, I2) having a fourth frequency that is lower than the third frequency.

In a typical implementation, the first frequency (of S1) is the same or at least substantially the same as the fourth frequency (of I2). Moreover, the OPO device 102 is configured to resonate at the first frequency (of S1) and the fourth frequency (of I2).

According to the illustrated implementation, the five different output frequencies (S1=I2, S2, I1, P1, and P2) from the OPO device 102 include: a low (idler) frequency (I1) generated at the first nonlinear optical element OPO1, a high (signal) frequency (S1) generated at the first nonlinear optical element OPO1, a high (signal) frequency (S2) generated at the second nonlinear optical element OPO2 and two non-converted residual pump frequencies (P1 and P2). As previously mentioned, in the illustrated implementation, the high (signal) frequency (S1) generated at the first nonlinear optical element OPO1 is the same or at least substantially the same as the lower (idler) frequency (of I2) generated at the second nonlinear optical element OPO2.

In some implementations, the system 100 also includes two lasers, neither of which is shown in the FIG. 1. In such implementations, a first of the two lasers would be configured to produce the first pump beam P1 that is shown being input into the optical resonator 104 and the second of the two lasers would be configured to produce the second pump beam P2 that is shown being input into the optical resonator 104. As implicitly suggested by the illustrated implementation, the first laser and the second laser would be external to the optical resonator 104. Some examples of possible laser-sources include diode-, solid-state-, gas- or fiber-lasers (among others).

Thus, in a typical implementation of the system 100 in FIG. 1, the two pump beams P1, P2 from the two pump lasers have different frequencies. They enter the optical resonator 104 and get focused onto the two nonlinear optical elements OPO1, OPO2 within the optical resonator 104, as shown. Two new frequencies (i.e., S1, I1 and S2, I2) are generated at each of the two nonlinear optical elements (OPO1, OPO2, respectively). The higher of the generated frequencies (S1) from the first nonlinear optical element OPO1 is the same or at least substantially the same as the lower of the generated frequencies (I2) from the second nonlinear optical element OPO2. Additionally, in a typical implementation, that frequency (S1, I2) is also the resonant frequency of the optical resonator 104.

Figure 2:
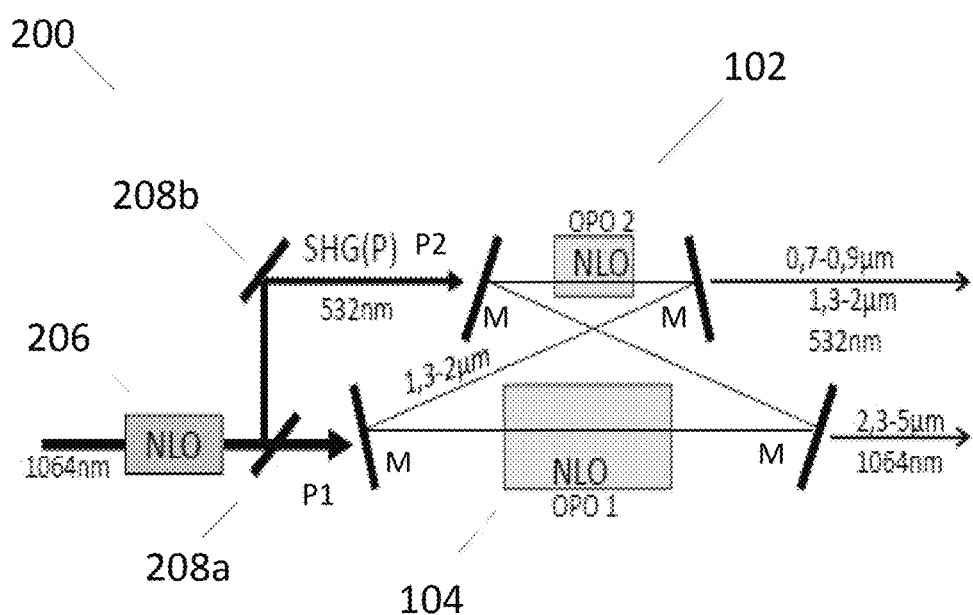
FIG. 2 is a schematic representation of another exemplary implementation of a system that includes a dual frequency pumped OPO-device.

FIG. 2 is a schematic representation of second exemplary system 200 that includes an optical parametric oscillator (OPO) device 102.

The system 200 in FIG. 2 is similar in some ways to the system 100 represented in FIG. 1.

In this regard, the system 200 in FIG. 2 has an OPO device 102 with an optical resonator 104, a first nonlinear optical element (e.g., a crystal configured for Optical Parametric Oscillation) OPO1, and a second nonlinear optical element (e.g., also a crystal configured for Optical Parametric Oscillation) OPO2. There are two input pump beams P1 and P2 being directed into the optical resonator 104. The optical resonator 104 consists of an arrangement of mirrors (M) that forms a resonator for light. The output from the optical resonator 104 includes five different frequencies.

The system 200 in FIG. 2 is different in some ways than the system 100 in FIG. 1.

For example, in the system 200 represented FIG. 2 there would be only one laser source. That laser source would generate and supply the first pump beam only (marked 1064 nm at the left side of the drawing). The second pump beam (marked 532 nm) is generated by second harmonic generation (SHG) of the first pump beam before the pump beam enters the optical resonator 206. More particularly, the SHG occurs at nonlinear element 206, which is outside and upstream of the optical resonator 104.

In this regard, nonlinear element 206 receives the input pump beam (e.g., from an input laser not shown in FIG. 2) and produces a first output having a first wavelength (that will enter the optical resonator 104 directed to OPO1) and a second output having a second wavelength (that will enter the optical resonator directed to OPO2). Typically, the second wavelength is lower than (e.g., half of) the first wavelength. The first wavelength in the output of the third nonlinear element 206 in the illustrated example is the same as the wavelength of the input pump beam. The second wavelength in the output of the third nonlinear element 206 is the converted pump laser emission, having double the frequency of the input pump beam.

Generally speaking, SHG (also called frequency doubling) is a nonlinear optical process in which photons with the same frequency interacting with a nonlinear material are effectively "combined" to generate new photons with twice the energy, and therefore twice the frequency (and half the wavelength) of the initial photons.

After SHG at the nonlinear element 206, P1 and P2 are directed by additional optical elements (e.g., mirrors/lenses) 208a, 208b into the optical resonator 104. More particularly, in the illustrated implementation, optical element 208a is configured to allow P1 to pass straight through it and enter the optical resonator 104 heading toward the first nonlinear element OPO1, and reflect P2 toward optical element 208b. Optical element 208b is configured to reflect P2 into the optical resonator 104 toward the second nonlinear element OPO2. The optical elements 208a, 208b in the illustrated implementation are positioned downstream of the external nonlinear element 206 and upstream of the optical resonator 104.

FIG. 2 also includes details about exemplary wavelengths or ranges of wavelengths that might be present at various points in system 200. In this regard, the pump wavelength in the illustrated example is 1064 nanometers. The wavelengths being input into the optical resonator 104 in the illustrated example are 1064 nanometers (for P1) and 532 nanometers (for P2). The OPO device 102 can be resonating within the wavelength range of 1.3-2 micrometers in the illustrated example. The output from the optical resonator 104 can be tuned across wavelength ranges as follows: S2 (0.7-0.9 micrometers), S1=I2 (1.3-2 micrometers), P2 (532 nanometers), I1 (2.3-5 micrometers), and P1 (1064 nanometers) in the illustrated example.

Figure 3:
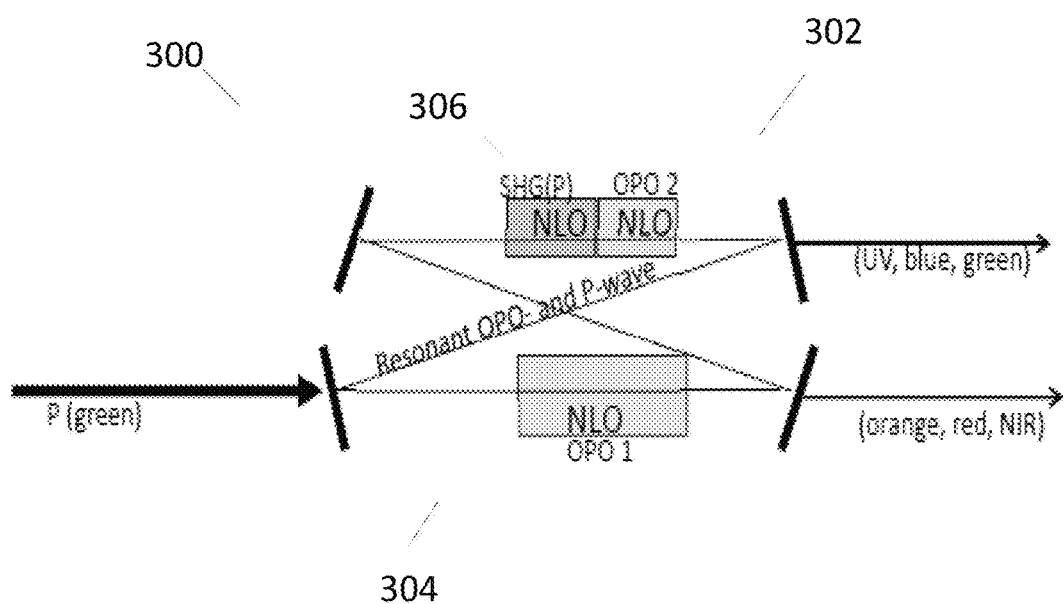
FIG. 3 is a schematic representation of yet another exemplary implementation of a system that includes a dual frequency pumped OPO-device.

FIG. 3 is a schematic representation of third exemplary system 300 that includes an optical parametric oscillator (OPO) device 302.

The system 300 in FIG. 3 is similar in some ways to the system 200 represented in FIG. 2.

In this regard, the system 300 in FIG. 3 has an OPO device 302 with an optical resonator 304, a first nonlinear optical element (e.g., a crystal configured for Optical Parametric Oscillation) OPO1, and a second nonlinear optical element (e.g., also a crystal configured for Optical Parametric Oscillation) OPO2. The optical resonator 304 consists of an arrangement of mirrors (M) that forms a resonator for light.

The system 300 in FIG. 3 is also different in some ways from the system 200 represented in FIG. 2.

For example, unlike system 200 in FIG. 2, in system 300 of FIG. 3, the second harmonic generation is done inside the optical resonator 304. In this regard, system 300 in FIG. 3 has a nonlinear element 306 (configured for SHG) inside the optical resonator 304. Moreover, in system 300 of FIG. 3, there is only one pump beam (labeled P(green)) being input to the optical resonator 304.

The optical resonator 304 is configured to enhance the first pump beam within the resonator. In a typical implementation, the mirrors (M) are highly reflective for the first pump frequency. Moreover, in a typical implementation, the length of the optical resonator 304 is adjustable and may be controlled, for example, in order to fulfill the resonance conditions for the first pump frequency. The means for changing the resonator length may be a piezo actuator to which one of the resonator mirrors is attached.

The third nonlinear element 306 in the system 300 of FIG. 3 is configured for second harmonic generation (SHG) of light that passes through it. Since the third nonlinear element 306 is inside the optical resonator 304, light may pass through the third nonlinear element 306 more than once; typically it does so multiple times. This is unlike the arrangement shown in the system 200 of FIG. 2, where the pump beam may pass through the external nonlinear element 206 (for SHG) only once. Since light can pass though the nonlinear element 306 more than once, greater conversion efficiencies may be realized in a system like the one in FIG. 3 as compared to the system 200 in FIG. 2. Moreover, in contrast to the other embodiments, the OPO threshold may be lower in a system like the one in FIG. 3 due to enhancement of the resonating power of the first pump beam and the high efficiency associated with generating the second pump beam. As a result, it may be possible that a lower power pump laser can be used. That said, however, generally speaking, the possibility of achieving greater conversion efficiency may come at the expense of other rather complex technical challenges (e.g., relating to controlling the effective length of the optical resonator, etc.).

FIG. 3 also includes details of exemplary colors (wavelengths or wavelength ranges) that might be present at various points in system 300 during operation. In this regard, the single pump beam is identified as being green and the output is identified as including ultraviolet (UV), blue, green, orange, red and near infrared (NIR).

Figure 4A:
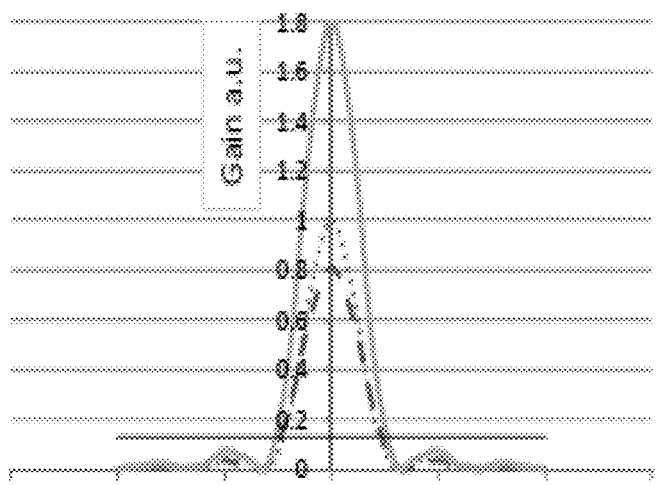
FIGS. 4A-4C are exemplary plots showing gain profiles for two respective nonlinear optical elements in respective OPO devices and gain profiles for the overall OPO device that includes the two nonlinear optical elements.
Figure 4B:
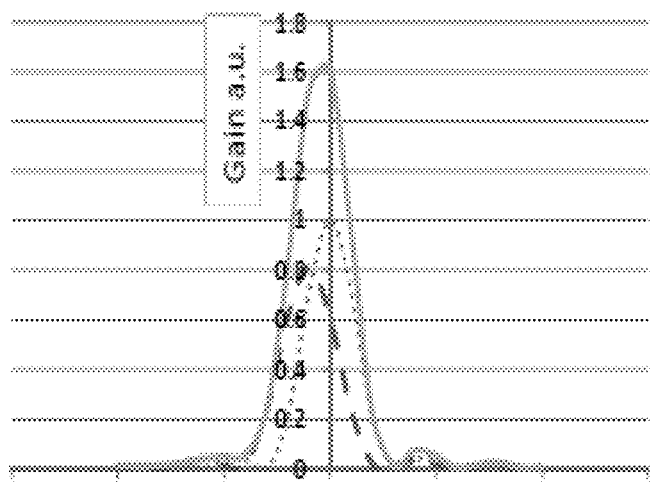
Figure 4C:
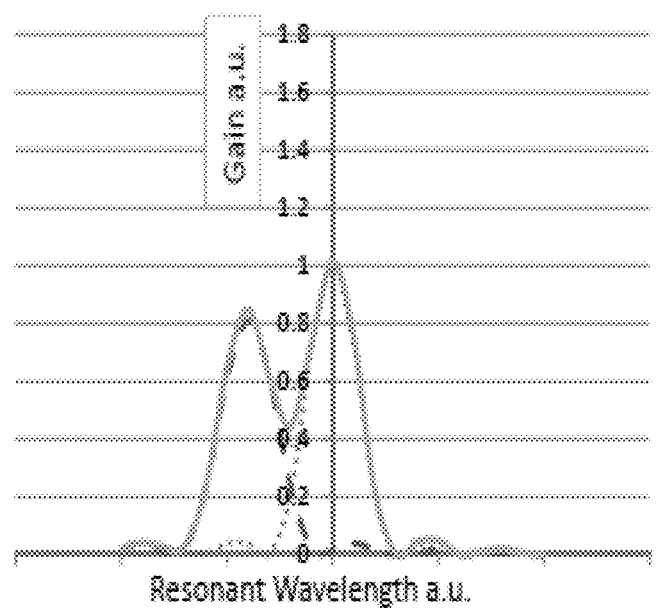

FIGS. 4A-4C are plots showing gain profiles for nonlinear optical elements (e.g., OPO1, OPO2 in FIG. 2) in an OPO device (e.g., 102 in FIG. 2) and for the overall OPO device (e.g., 102 in FIG. 1) itself. In each plot, the x-axis represents resonant wavelength (in arbitrary units) and the y-axis represents gain (also in arbitrary units). In each plot, the dotted curve represents a gain-curve for nonlinear optical element OPO1, the interrupted curve represents a gain-curve for nonlinear optical element OPO2 and the solid curve represents a combined gain-curve of the whole OPO device (e.g., 102 in FIG. 1).

Each plot represents one of three different situations of phase matching conditions in the two nonlinear optical elements (e.g., OPO1, OPO2) of a system (e.g., system 100 in FIG. 1).

The plot in FIG. 4A represents what might be considered an ideal situation where the gain curves of the two nonlinear optical elements (e.g., OPO1, OPO2) for the resonant wave are exactly matched (or optimized). In this situation, the OPO device oscillates on one frequency with maximum gain.

The plot in FIG. 4B represents a situation where there is just a very small phase-mismatch between the two nonlinear optical elements (e.g., OPO1, OPO2) so that the two gain curves can still be termed substantially matched. In this context, the phrase "substantially matched" may mean that the gain curve for the overall OPO device shows one dominant maximum so that the OPO likely oscillates on one mode. The OPO device in the example illustrated in FIG. 4B oscillates on one frequency, but with a slightly lower gain that in FIG. 4A.

The plot in FIG. 4C represents a situation generally considered undesirable. In that situation, the phase-mismatch between the two nonlinear optical elements (e.g., OPO1, OPO2) is so large that the OPO device 102 likely will oscillate on two frequencies, the gain for each frequency being comparable to that of a single one of the OPOs.

Considering FIGS. 4A-4C collectively, it should be appreciated that, if the resonant wavelengths of the two nonlinear elements in a single OPO device are sufficiently matched (e.g., exactly matched or at least substantially matched), the OPO device will operate more favorably in certain wavelength regions, and produce a desired output (e.g., S1=I2, S2, I1, P1, P2), even though under similar operating conditions no such output would be produced if the OPO device included only one of the two nonlinear optical elements.

Figure 5A:
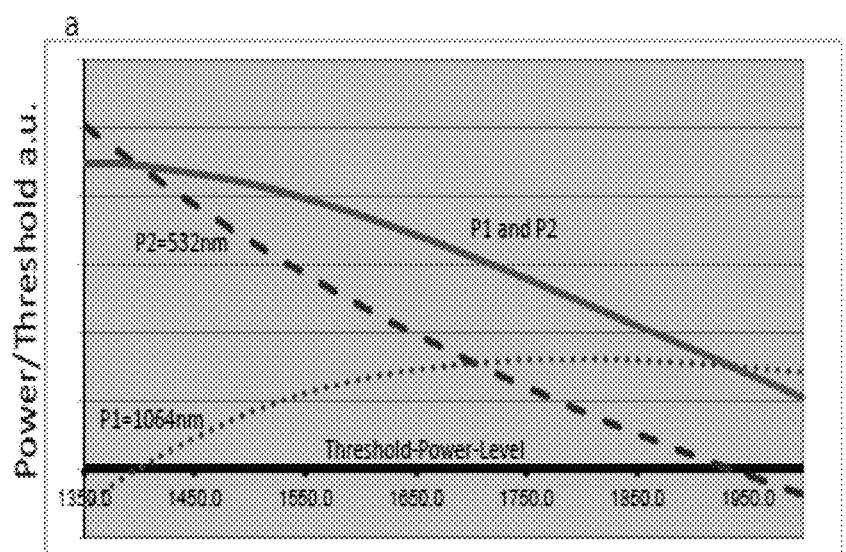
FIGS. 5A and 5B are plots representing the resonant behavior of two OPOs, individually and collectively, in an exemplary OPO device.
Figure 5B:
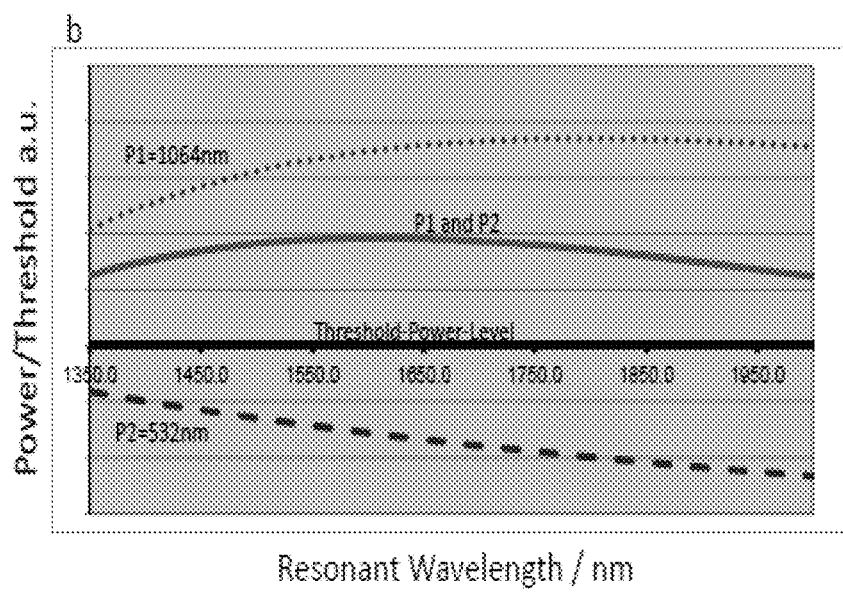

FIGS. 5A and 5B are plots representing the resonant behavior of two OPOs (e.g., OPO1 and OPO2 in FIG. 1), individually and collectively, in an exemplary OPO device, such as OPO device 102 in FIG. 1. The x-axis in each plot represents resonant wavelength (in nanometers) and the y-axis in each plot represents power/threshold (in arbitrary units). In each plot, the dotted curve (P1=1064 nm) represents the resonant behavior associated with nonlinear optical element OPO1, the interrupted curve (P2=532 nm) represents the resonant behavior associated with nonlinear optical element OPO2 and the solid curve (P1 and P2) represents the resonant behavior of the whole OPO device (e.g., 102 in FIG. 1, including nonlinear optical element OPO1 and nonlinear optical element OPO2). In each plot, there is a horizontal line representing a threshold power level, below which optical parametric oscillation does not occur.

Referring to FIG. 5A, the pump power for nonlinear optical element OPO2 is below the threshold power level at high resonant wavelengths (e.g., above about 1950 nm) and the pump power for nonlinear optical element OPO1 is below the threshold power level for low resonant wavelengths (e.g., below about 1300 nm). However, the overall OPO device (represented by the solid "P1 and P2" curve) will oscillate over the full range.

FIG. 5B represents a scenario where for one of the OPOs (i.e., OPO 2 (P2=532 nm)), the pump power is too low over the full range of resonant wavelengths. Therefore, on its own, OPO2 would not oscillate at all without the support from the other OPO (i.e., OPO1, P1=1064 nm). However, the pump-power for OPO1 is enough above the threshold power level that it enables the combined OPO device to oscillate.

A number of embodiments of the invention have been described. Nevertheless, it will be understood that various modifications may be made without departing from the spirit and scope of the invention.

For example, the various components, devices, structures, etc disclosed herein can be formed as semi-monolithic and monolithic designs, where components may combine more than one feature, e.g., mirrors coated directly onto a nonlinear optical element or a nonlinear optical element containing more than one poling period along beam propagation.

As another example, the optical resonators disclosed herein can vary considerably. For example, the number and arrangement of optical elements (e.g., mirrors, lenses, coatings, etc.) in an optical resonator may differ from what has been explicitly disclosed herein. Moreover, the size and relative arrangement of optical and other elements can vary considerably.

Additionally, the nonlinear optical elements disclosed herein can vary considerably. Indeed, each nonlinear optical element can take on a variety of different forms, shapes and be made from any one or more of a variety of different materials. Likewise, the size and/or positioning of each nonlinear optical element can vary considerably. Also, the specific operational characteristics of the nonlinear optical elements can vary.

Moreover, the specific wavelengths/frequencies of light used in connection with the concepts disclosed herein can vary considerably.

Also, the specific way that light is directed into or out of the optical resonator may vary considerably.

The systems, devices, components, etc. disclosed herein can be combined with a variety of other systems, devices, components, etc. in a variety of ways.

While this specification contains many specific implementation details, these should not be construed as limitations on the scope of any inventions or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings and described herein as occurring in a particular order, this should not be understood as requiring that such operations be performed in the particular order shown or in sequential order, or that all illustrated operations be performed, to achieve desirable results.

Other implementations are within the scope of the claims.

What is claimed is:

1. A system comprising an optical parametric oscillator (OPO) device comprising:
   an optical resonator;
   a first nonlinear optical element configured to receive a first pump beam and to produce, via optical parametric oscillation of the first pump beam, a first output having a first frequency and a second output having a second frequency, wherein the second frequency is lower than the first frequency; and
   a second nonlinear optical element configured to receive a second pump beam, wherein the second pump beam has a higher frequency than the first pump beam, and to produce, via optical parametric oscillation of the second pump beam, a third output having a third frequency and a fourth output having a fourth frequency, wherein the fourth frequency is lower than the third frequency,
   wherein the first frequency is the same as the fourth frequency, and
   wherein the first nonlinear optical element and the second nonlinear optical element are inside the optical resonator, and the OPO device is configured to resonate at the first frequency and the fourth frequency.

2. The system of claim 1, further comprising:
   a first laser to produce the first pump beam; and
   a second laser to produce the second pump beam.

3. The system of claim 2, wherein the first laser and the second laser are outside the optical resonator.

4. The system of claim 1, further comprising:
   a first laser to produce the first pump beam; and
   a third nonlinear optical element configured to produce the second pump beam from the first pump beam.

5. The system of claim 4, wherein the third nonlinear optical element is configured to produce the second pump beam by second harmonic generation (SHG) of the first pump beam.

6. The system of claim 4, wherein the third nonlinear optical element is inside the optical resonator.

7. The system of claim 4, wherein the third nonlinear optical element is outside the optical resonator.

8. A method for producing widely frequency tunable laser radiation from a system that comprises an optical parametric oscillator (OPO) device, wherein the OPO device comprises an optical resonator, a first nonlinear optical element inside the optical resonator, and a second nonlinear optical element inside the optical resonator, the method comprising:
   receiving a first pump beam at the first nonlinear optical element;
   producing, via optical parametric oscillation of the first pump beam at the first nonlinear optical element, a first output having a first frequency and a second output having a second frequency, wherein the second frequency is lower than the first frequency;
   receiving a second pump beam at the second nonlinear optical element, wherein the second pump beam has a higher frequency than the first pump beam; and
   producing, via optical parametric oscillation of the second pump beam at the second nonlinear optical element, a third output having a third frequency and a fourth output having a fourth frequency, wherein the fourth frequency is lower than the third frequency;
   wherein the first frequency is the same as the fourth frequency, and
   wherein the OPO device is configured to resonate at the first frequency and the fourth frequency.

9. The method of claim 8, wherein the system further comprises a first laser and a second laser, the method further comprising:
   producing the first pump beam with the first laser; and
   producing the second pump beam with the second laser.

10. The method of claim 9, wherein the first laser and the second laser are outside the optical resonator.

11. The method of claim 8, wherein the system further comprises a first laser and a third nonlinear optical element, the method further comprising:
    producing the first pump beam with the first laser; and
    producing the second pump beam with the third nonlinear optical element from the first pump beam.

12. The method of claim 11, wherein producing the second pump beam comprises second harmonic generation (SHG) of the first pump beam at the third nonlinear optical element.

13. The method of claim 11, wherein the third nonlinear optical element is outside the optical resonator.

14. The method of claim 11, wherein the third nonlinear optical element is inside the optical resonator.

15. A method of manufacturing an optical parametric oscillator (OPO) device, the method comprising:
    providing an optical resonator;
    configuring a first nonlinear optical element inside the optical resonator to receive a first pump beam and to produce, via optical parametric oscillation of the first pump beam:
       a first output having a first frequency, and
       a second output having a second frequency,
          wherein the second frequency is lower than the first frequency; and
    configuring a second nonlinear optical element inside the optical resonator to receive a second pump beam that has a higher frequency than the first pump beam, and to produce, via optical parametric oscillation of the second pump beam:
a third output having a third frequency, and
a fourth output having a fourth frequency,
wherein the fourth frequency is lower than the third frequency,
wherein the first frequency is the same as the fourth frequency, and
wherein the OPO device resonates at the first frequency and the fourth frequency.

16. The method of claim 15, further comprising:
configuring a first laser to produce the first pump beam; and
configuring a second laser to produce the second pump beam,
wherein the first laser and the second laser are outside the optical resonator.

17. The method of claim 15, further comprising:
configuring a first laser to produce the first pump beam; and
configuring a third nonlinear optical element to produce the second pump beam from the first pump beam.

18. The method of claim 17, wherein the third nonlinear optical element is inside the optical resonator.

19. The method of claim 17, wherein the third nonlinear optical element is outside the optical resonator.

* * * * *